(No Model.) 4 Sheets—Sheet 1.
C. F. BASSETT.
CORN HARVESTER.
No. 335,877. Patented Feb. 9, 1886.
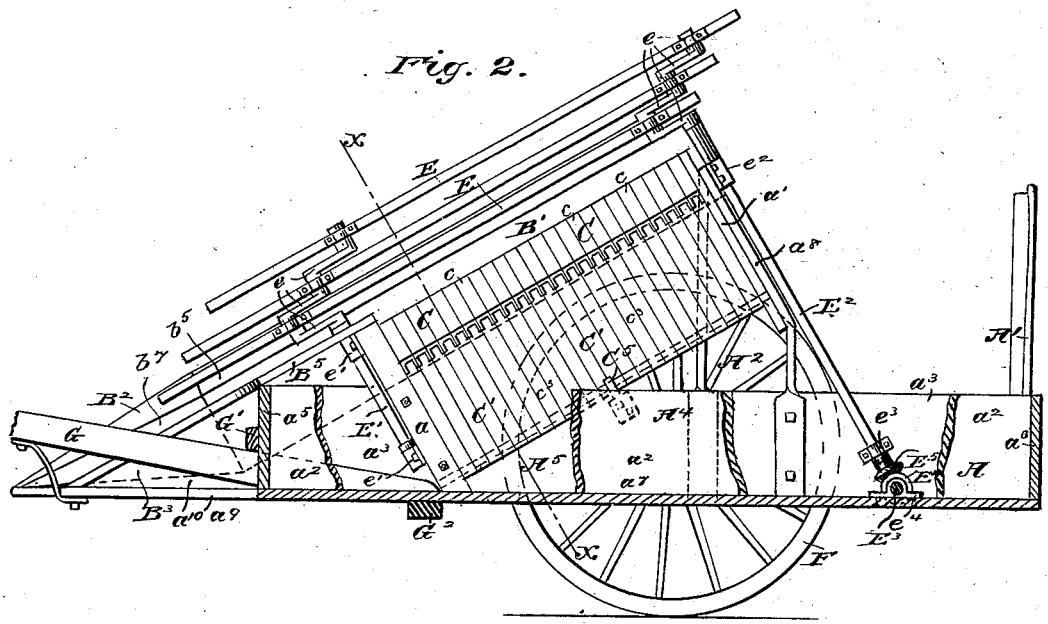
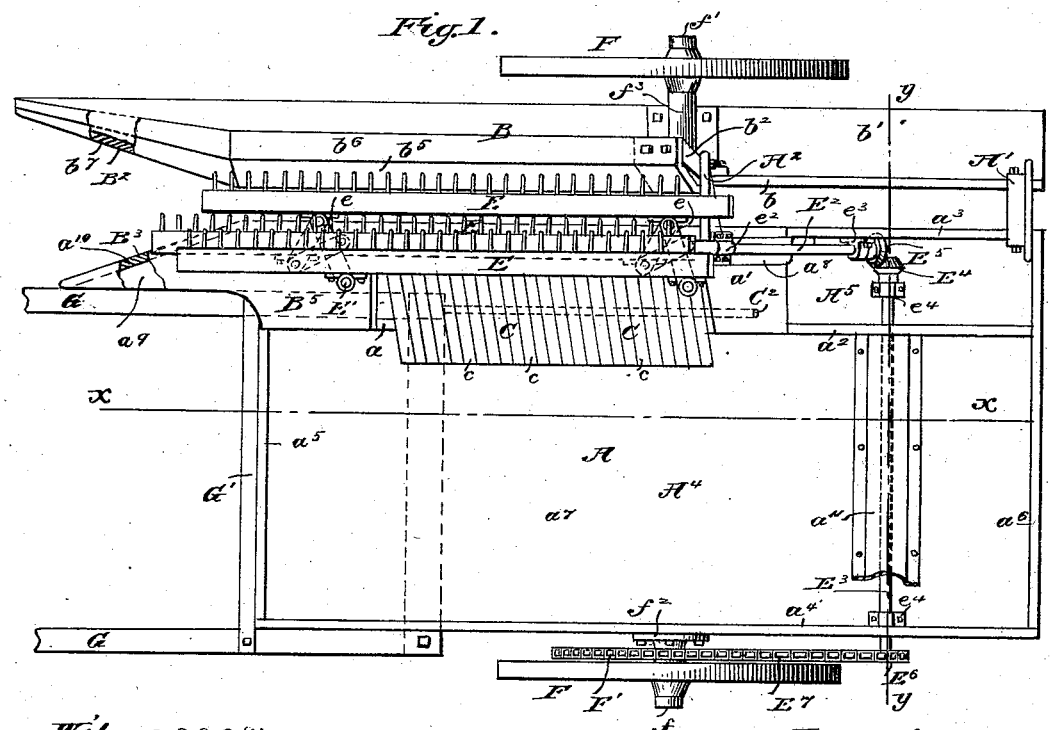
Witnesses:
Jno. H. Stockett.
C. C. Poole
Inventor:
Charles F. Bassett
by M. E. Dayton
Attorney (No Model.) 4 Sheets—Sheet 2.
C. F. BASSETT.
CORN HARVESTER.
No. 335,877. Patented Feb. 9, 1886.
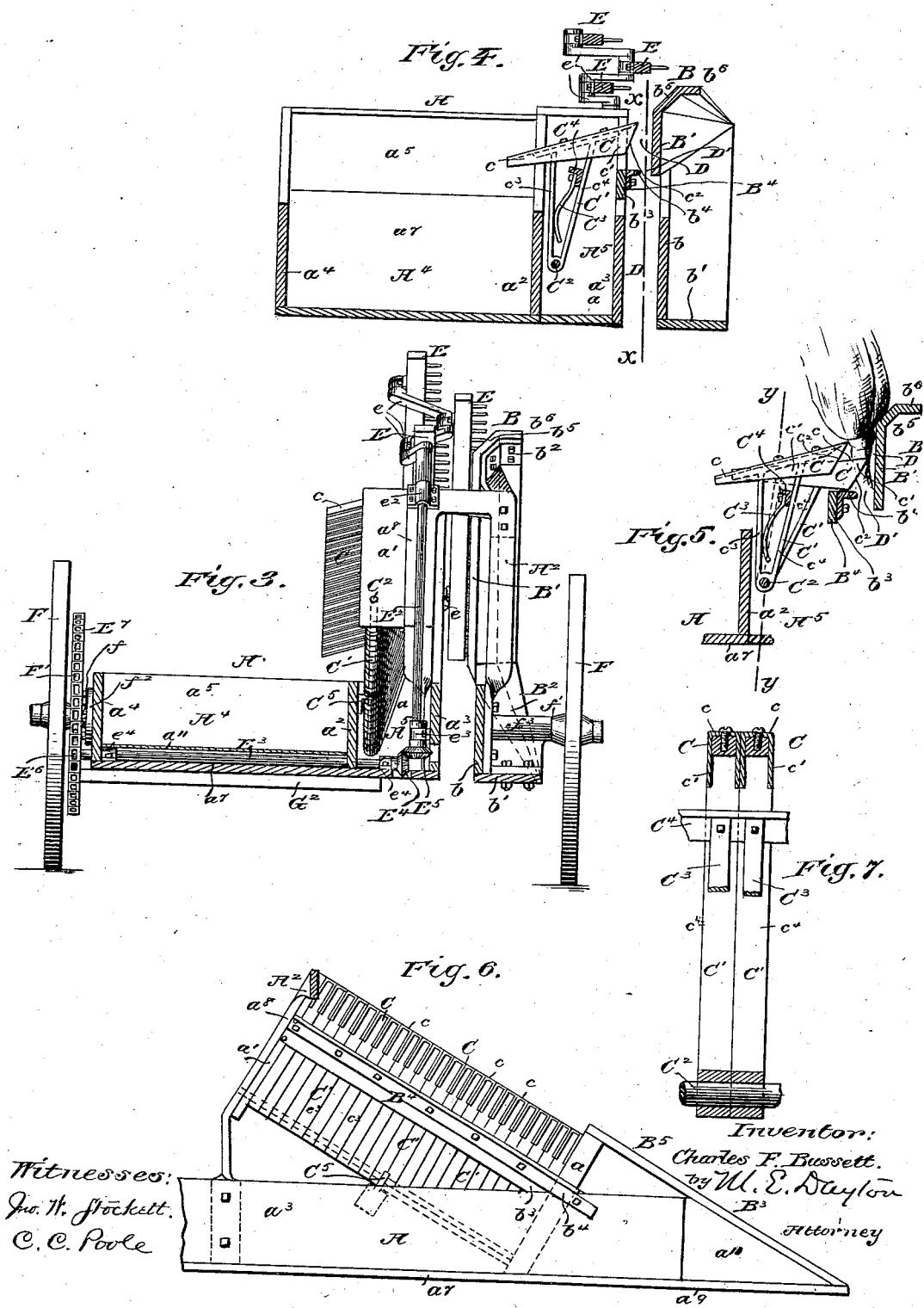
Witnesses:
Jno. W. Stockett.
C. C. Poole
Inventor:
Charles F. Bassett.
by M. E. Dayton
Attorney (No Model.)
C. F. BASSETT.
CORN HARVESTER.
No. 335,877.  Patented Feb. 9, 1886.
4 Sheets—Sheet 3.
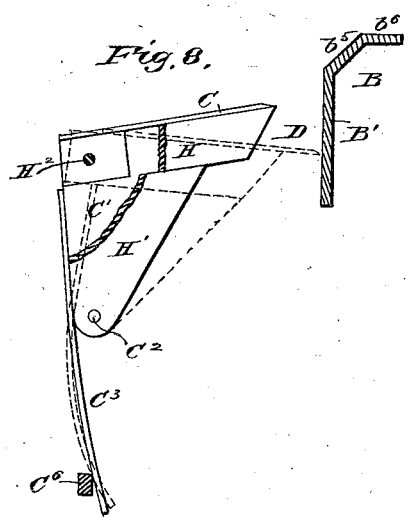
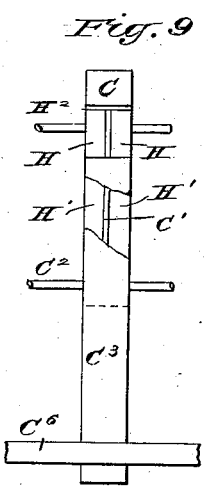
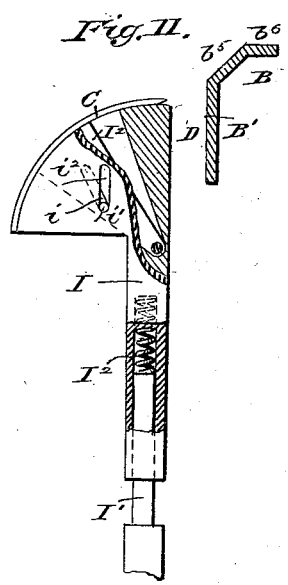
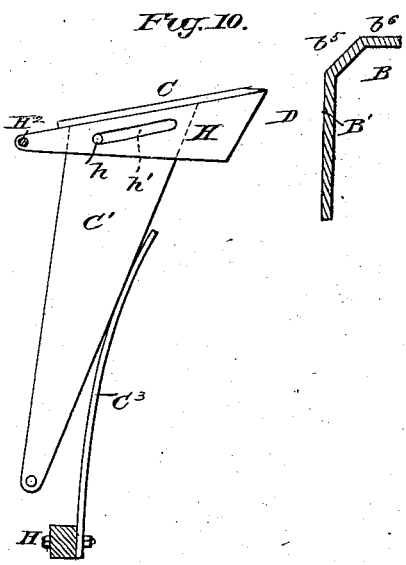
Witnesses:
Jno. W. Stockett
C. C. Poole
Inventor:
Charles F. Bassett
by M. E. Dayton
Attorney (No Model.)  4 Sheets—Sheet 4.

C. F. BASSETT.
CORN HARVESTER.

No. 335,877.  Patented Feb. 9, 1886.

Witnesses:
Jno. W. Stockett.
C. C. Poole.

Inventor:
Charles F. Bassett,
by M. E. Dayton
Attorney.

N. PETERS. Photo-Lithographer, Washington, D. C.

UNITED STATES PATENT OFFICE.

CHARLES F. BASSETT, OF CHICAGO, ILLINOIS.

CORN-HARVESTER.

SPECIFICATION forming part of Letters Patent No. 335,877, dated February 9, 1886.

Application filed October 6, 1884. Serial No. 144,812. (No model.)

*To all whom it may concern:*

Be it known that I, CHARLES F. BASSETT, of Chicago, in the county of Cook and State of Illinois, have invented certain new and useful Improvements in Corn-Harvesters; and I do hereby declare that the following is a full, clear, and exact description thereof, reference being had to the accompanying drawings, and to the letters of reference marked thereon which form a part of this specification.

This invention relates to that class of corn-harvesters which are designed to cut the ears from the standing corn and gather them into a receptacle attached to the machine, leaving the stalks standing in the field; and it consists in the matters hereinafter set forth and claimed.

Figure 12:
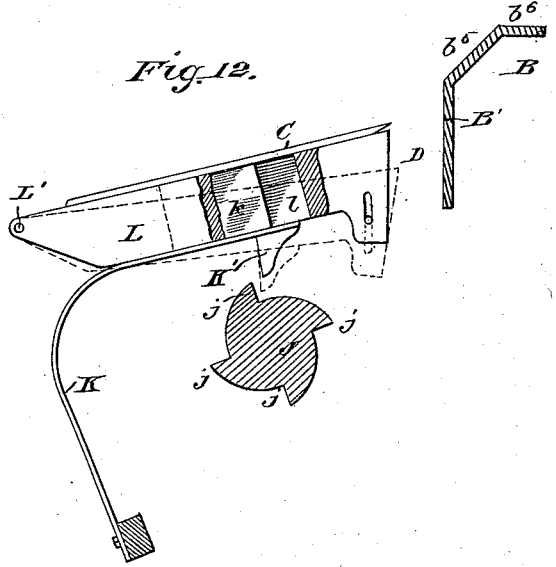
Figure 13:
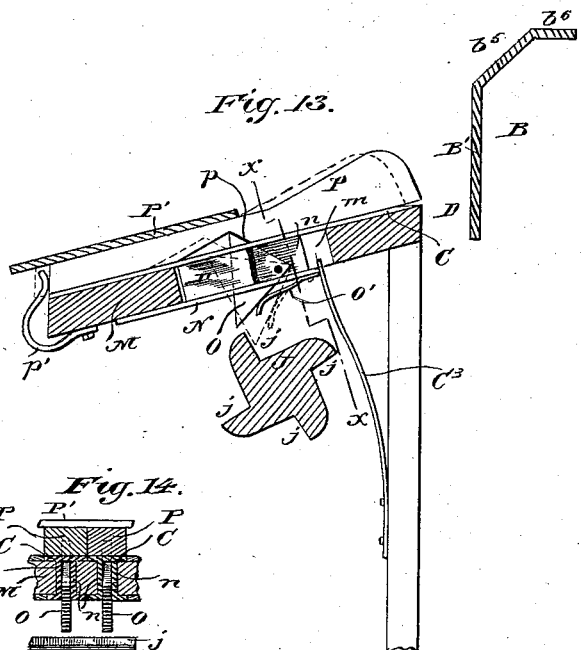
Figure 14:
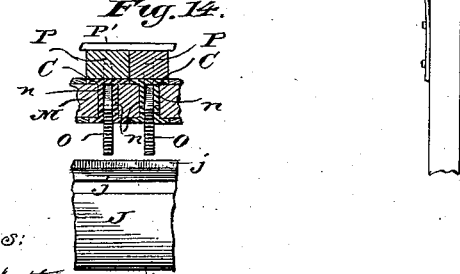

In the accompanying drawings, which represent a corn-harvester embodying the present invention in one of its forms, Figure 1 is a plan view of the machine. Fig. 2 is a vertical longitudinal section of the same, taken on the line $x\,x$, Fig. 1. Fig. 3 is a vertical transverse section showing the parts to the left of the line $y\,y$, Fig. 1. Fig. 4 is a transverse section on the line $x\,x$, Fig. 2. Fig. 5 is a similar view of the parts shown in Fig. 4, showing one of the cutters in operation. Fig. 6 is a vertical longitudinal section on the line $x\,x$, Fig. 4, showing the parts to the left of that line. Fig. 7 is an enlarged fragmentary section in detail on the line $y\,y$, Fig. 5. Fig. 8 is a fragmentary side elevation in detail showing a modified form of the cutter and connected parts. Fig. 9 is a similar view of the same on a plane at right angles to that of Fig. 8. Fig. 10 is a fragmentary side elevation in detail of a second modified form of cutter and its connections. Fig. 11 is a fragmentary side elevation in detail of a third modified form of cutter and its connections. Figs. 12, 13, and 14 illustrate other modifications in the devices whereby the novel cutters may be actuated.

My improved machine in the form in which it is herein presented is contrived to operate upon one row of corn at a time, and consists, generally, of a main body or receptacle, A, for the severed ears, having attached to it at one side a longitudinal guide-piece, B, which passes outside of the row of corn to be operated upon and is rigidly connected with the main body A by means of the yokes $A'\,A^2$ of inverted-U shape, and a series of cutters, C, for severing the ears from the standing corn, said cutters being arranged upon the main body A with their cutting-edges upon an upwardly and rearwardly inclined line and parallel with the inner surface of a correspondingly-inclined guide, $B'$, upon the outer guide-piece, B, so as to form a narrow passage, D, between the said guide and the cutters of sufficient width to permit the cornstalks to pass freely through it, but of less width than the diameter of the ears.

The cutters C, which present the principal feature of novelty in my machine, are placed side by side in contact with each other, and are independently movable and arranged to operate in opposition to the guide $B'$, forming the outer wall of the passage D, and in a direction therefore transverse to said passage, their action being such that the stem of the ear when brought between either of said cutters and the opposing guide is severed by the forward movement of the cutter. The cutters are automatically actuated by the contact of the ears with the upper surface of the said cutters, or with a movable part connected therewith, (such contact being occasioned by reason of the diameter of the ears being greater than the width of the passage D between the cutters and the guide $B'$,) as the stalks are drawn backwardly and downwardly through the said passage in the forward movement of the machine, several different ways of operating the cutters being herein illustrated and described.

The machine is provided at its forward end with suitable converging guides, $B^2$ and $B^3$, for directing the cornstalks properly to the passage D, and also preferably with one or more longitudinally-arranged revolving rakes, E, adapted to carry the stalks backwardly into the passage D in serial order, whereby the cutters may better act to sever the ears, as will be hereinafter more fully described.

The machine is sustained at its rear end by two wheels, F F, supported from the body A, at one side thereof, and from the guide-piece B at the opposite side, and two thills, G G, are attached to the front end of the body A, in which a horse is harnessed for drawing the machine, and which support the front end thereof.

To more fully describe the machine in the form in which it is illustrated in the accompanying drawings, the main body of the machine is composed of three longitudinal pieces, $a^2$, $a^3$, and $a^4$, and two transverse pieces, $a^5$ and $a^6$, arranged with their flat sides vertical, and a bottom, $a^7$, these parts forming a box or receptacle, $A^4$, to receive the severed ears of corn, and a chamber, $A^5$, in which the lower parts of the devices supporting the cutters C are located. The guide-piece B consists of a piece or plank, $b$, arranged longitudinally with its flat side vertical, and a plank, $b'$, also arranged longitudinally with its flat side horizontal, and securely fastened to the edge of the board $b$, the said pieces being attached to the adjacent side pieces, $a^3$, of the body A by the yokes $A'$ and $A^2$, which are bolted at their lower ends to the said pieces $b$ and $a^3$, near the rear ends of the latter, so as to form a rigid forwardly-projecting arm or support, to which the forward and lower end of the inclined guide $B'$ is attached. The rear end of the said guide is bolted to and supported by a plate or bracket, $b^2$, bolted to the upper end of the forward yoke, $A^2$. The wheels F F are mounted on short axles $f\ f'$, one of which, $f$, is secured in a plate, $f^2$, bolted to the frame-piece $a^4$ on one side of the machine, and the other is fixed in a bracket or casting, $f^3$, bolted to the frame-pieces $b$ and $b'$ on the opposite side. The shafts G G are, as shown, attached to the ends of transverse horizontal pieces $G'\ G^2$, fastened firmly to the front end and under side of the main body A of the machine-frame, respectively.

In the particular form of the cutters shown in connection with the machine illustrated, as seen in Figs. 1 to 7, the cutters C are severally mounted upon the upper ends of independently-movable arms $C'$, which are pivotally supported upon a common pivot-rod, $C^2$, arranged parallel with the guide $B'$ below and to the rear of the cutting-edges of the cutters, as clearly shown in Figs. 4 and 5, so that a downward pressure upon the said edges will cause the arms to rotate upon the rod so as to carry the cutters across the passage D and into contact with the opposing guide $B'$. The cutters are held at the rearward limit of their movement in this case by springs $C^3$, secured to a stationary part of the frame and acting upon the arm $C'$, and are thrown forward by the downward pressure of the ears upon the edges of the cutters when the said ears are brought forcibly against the said cutters by the rearward movement of the stalks through the passage D, the said stalks being usually, on account of the upward and rearward inclination of the line of cutters and the opposing guide $B'$, bent forward and drawn longitudinally downward through the passage between the cutters and guide in the forward movement of the machine. The said guide obviously operates as a cutting-board to hold the stem of the ear against the thrust of the cutter while the said stem is being severed, as well as to thrust and hold the ear against the cutters so as to cause their engagement therewith.

In the operation of the device in the manner described the cutters, inasmuch as they are pressed downwardly by the immediate contact of the butts of the ears with their upper surfaces, will usually sever the stems sufficiently close to the ear to cut through a portion or all of the husks above their points of connection with the stem. This feature of the operation of the cutting devices is obviously advantageous, for the reason that the husks are thereby entirely detached, or the ears are left in a condition favorable for the easy removal of the husks. The cutters are of course liable to occasionally cut off the cornstalks as well as the stems of the ears, and this will usually occur when the part of the stem adjacent to the ear is close to the stalk. No material disadvantage is found to exist by such cutting off of the stalks, as the cut tops, if they fall into the receptacle with the ears, may be readily separated therefrom. In the employment of the rakes E, hereinbefore described as used to force the stalks backward in the passage D, however, the stalks are less liable to be cut off, for the reason that the ears in the backward movement of the stalks are, in catching upon the cutters, liable to be drawn forward laterally away from the stalks, and the stems thereby presented separately to the action of the cutters. In the use of the rakes E, also, the tops which are severed will usually be prevented from falling inwardly toward the receptacle A by the said rakes, which, as they are engaged with the tops above the knives, will tend to bend the said tops outwardly, and thereby cause them to fall outward over the guide $B'$ to the ground.

The cutters C, as shown in the figures above mentioned, are desirably arranged in a position inclined transversely to the machine, with their rear ends sloping downwardly toward the receptacle, whereby the severed ears falling upon the cutters will slide readily into the said receptacle. The cutters C and the supporting-arms $C'$ thereof are preferably all alike, and the former consist of flat plates $c$, sharpened at one end and adjustably secured to the upper surface of the said arms by screws passing through longitudinal slots in the plates and into the arms, as shown in Figs. 5 and 7. For the purpose of preventing the stalks or other parts of the corn from catching between the lower surface of one knife and an adjacent one which is thrust forward, or between two adjacent cutters which are unequally thrust forward, whereby the cutters may be prevented from returning to their normal position, the said cutters are provided upon their side edges with depending flanges $c'$, the forward ends of which are inclined downwardly and rearwardly from the cutting-edges, as indicated at $c^2$, so that a V-shaped opening will always be presented between the side edge of a cutter which is advanced and the front end of the flange upon the cutter adjacent to it, as clearly shown in Fig. 5, the angle between the edges mentioned being such that a stalk or other object coming between them will be forced out as the advanced cutter rises, and thereby allow the latter to promptly return to its normal position. The ends $c^2$ of the flanges $c'$ are preferably sharpened, in order that a cornstalk or other object caught between the said edge and the guide B' in the forward movement of the cutter will be cut into or severed, so that the proper action of the cutters will not be interfered with thereby.

As a simple and desirable construction in the arms C', they are made centrally open, or, in other words, are formed by means of two separate diverging arms, $c^3 c^4$, united at their upper and lower ends, and a bar, $C^4$, fixed at its ends upon the machine-frame is inserted between the bars $c^3 c^4$, and serves both as a stop to limit the rearward and forward movement of the cutters and as a support for the springs $C^3$, which are secured at one end to the said bar and rest at their opposite ends against the inner faces of the rear bars, $c^3$, of the arms. The bar $C^4$ and the pivot-rod $C^2$ are preferably held at their ends in two inclined frame-pieces, $a\ a'$, fixed upon the machine-frame, the piece $a$, as shown, being bolted to the longitudinal frame-piece $a^2$, and the piece $a'$ to an inclined part, $a^8$, of the forward yoke, $A^2$. The pivot-rod $C^2$ may be additionally supported midway of its length, as shown, by means of a bracket, $C^5$, bolted to the frame-piece $a^2$, so as to prevent the springing of the middle portion of the rod in the operation of the cutters.

In order to prevent the cornstalks from coming in contact with the edges of the cutters as they are carried or drawn rearwardly through the passage between the guide B' and the opposing edges of the said cutters, a guide, $B^4$, is preferably located beneath the overhanging ends of the cutters, with its guide-surface in advance of the cutting-edges of said cutters, so that a slot or passage, D', of slightly less width than the passage D, is formed between the said guides B' and $B^4$, in which passage the stalks are held closely in contact with the guide B' and away from the edges of the cutters.

In the particular construction herein shown the guide $B^4$ is formed by an inclined piece, $b^3$, secured at its ends to the frame-pieces $a$ and $a'$, and a bar, $b^4$, of angle-iron, secured to the piece $b^3$, with one of its edges projecting therefrom to form a narrow guide-surface for the said guide $B^4$.

The guide B' is, as shown, provided with an inner vertical guide-surface of sufficient width to extend from a point considerably above the edges of the cutters, when the latter are in their normal position, to a point opposite to or below the guide $B^4$, as clearly shown in Figs. 4 and 5, the said surface operating to thrust the butt or lower ends of the ears against the cutters when the said ears come in contact with the guide, and also to hold the ears from moving laterally away from the cutters as the latter are drawn downwardly together with the cutting-edges of the cutters in the operation of severing the stems.

It is obviously not essential that the surface of the guide B' should be perfectly flat or vertical, inasmuch as it may sometimes be found advantageous to make such surface convex or inclined from its upper edge toward the line at which the cutters come in contact with it, so that the ears will be forced by the guide toward the cutters as the latter are drawn downwardly and advanced; but the construction shown is for several reasons preferred.

In order to prevent the ears from catching upon the upper edge of the guide B' in the rearward and downward movement of the stalks, especially such ears as are bent downward or hang from their stems, an outwardly and upwardly inclined guide-piece, $b^5$, is preferably attached to the upper edge of the said guide B'. This guide-piece may be made of sufficient width for the purpose mentioned; or, as shown, a second guide-piece, $b^6$, may be attached to the guide-piece $b^5$, with its flat side at right angles with the vertical face of the guide B', this construction being clearly illustrated in Figs. 4 and 5.

The inclined guides $B^2$ and $B^3$, for directing the standing cornstalks into the passage between the cutters and the guide B', are, as herein shown, made as follows: The guide $B^2$, adjacent to the guide B', is formed by a vertical board, $b^7$, secured to the outwardly-inclined edge of the frame-piece $b'$, and united end to end with the frame-piece $b$ and two upwardly-inclined guide-pieces secured to the upper edge of the board $b^7$, and forming forward and downward extensions of the guide-pieces $b^5$ and $b^6$. The guide $B^3$ upon the main part of the machine-frame is formed by an upwardly and rearwardly inclined board, $B^5$, which is secured at its forward end to a forwardly-projecting part, $a^9$, of the bottom $a^7$, as shown in Fig. 2, and at its upper and rear end to the inclined frame-piece or support $a$, a board, $a^{10}$, being attached to the inclined edges of the part $a^9$ and of the board $B^5$, and continuous at its rear end with the frame-piece $a^3$, the said board $a^{10}$, together with the board $b^7$, forming the opposite outwardly-flaring guide-surfaces of the guides $B^3$ and $B^2$, respectively.

The rakes E, before mentioned as being employed to carry the cornstalks backwardly in the passage between the cutters and the guide B', consist, as herein shown, of longitudinal bars provided with laterally-projecting teeth adapted to engage the corn-tops, said bars, of which there are three shown, being supported upon and operated by two crank-shafts, $E'\ E^2$, each having three cranks, $e$, to which the said bars are connected near their ends. The said shafts $E'$ and $E^2$ are journaled upon the machine-frame in such position that in the rotary movement of the shafts the teeth of the rakes are brought over the passage D, so as to engage the cornstalks therein in the backward movement of the rake-bars, and in the forward movement of said bars are released from the said stalks. By this construction the rakes are obviously caused, in the rotary movement of the crank-shafts, to intermittingly and successively engage the cornstalks, and to thereby force the latter continuously through the passage D in the forward movement of the machine. The bars E may be arranged horizontally upon the machine-frame; but, preferably, they are upwardly and rearwardly inclined and parallel with the guide B′, and their forward ends are extended downward over the space between the guides B² and B³, so as to catch the stalks before they reach the portion of the narrow passage D′, which is in advance of the cutters, and thereby force said stalks backward into the said passage. The crank-shafts E′ and E² are of course inclined to correspond with the inclination of the rakes E, the forward shaft, E′, as herein shown, being mounted in bearings e′, attached to the frame-pieces a, and the rear shaft being supported in bearings e² and e³, attached, respectively, to the upper end of the yoke A² and the inner face of the longitudinal frame-piece a³. The shaft E² is rotated to actuate the rakes by means of suitable driving-connections with one of the supporting-wheels of the machine.

As shown in the drawings, a horizontal shaft, E³, is mounted transversely to the machine-frame in bearings e⁴ e⁴, attached to the bottom a⁷ of the body A. The said shaft is provided upon one end with a beveled gear-wheel, E⁴, arranged to intermesh with a corresponding gear-wheel, E⁵, upon the lower end of the shaft E², and is extended at its outer end beyond the side piece, a⁴, of the machine-frame, and provided with a sprocket-wheel, E⁶, over which wheel and a sprocket-wheel, F′, fixed to the hub of the wheel F, a chain-belt, E⁷, for actuating the said shaft from the said wheel F, is trained.

Other means than the reciprocating rakes E described may obviously be employed for forcing the cornstalks backwardly into the passage D; but the use of rakes moved in the manner described is preferred, for the reason, among others, that in the employment of a device such, for instance, as an endless band provided with teeth or projections to engage the stalks, any downwardly-hanging ears which might become caught upon the said belt would remain lodged thereon and thereby interfere with its action; whereas, in the use of a series of rakes, the latter, in their backward movement from the cornstalks, are released from any ears which may become caught upon them.

It is obviously not essential to the operation of the rakes E that they should be supported and moved by crank-shafts, as shown, and the same effect may be produced by any suitable devices adapted to give both a longitudinal and lateral reciprocatory movement to the rakes in such manner that they will successively engage and carry rearwardly the cornstalks, as before explained.

The shaft E³, by which the crank-shaft E² is actuated, is, as shown, placed above the bottom a⁷ of the receptacle A⁴, and is covered with a plate, a¹¹; but said shaft will usually be located below the said bottom.

Another form of the cutter, in which the latter is secured to the upper end of an arm, C′, pivoted upon the machine-frame at its lower ends by means of a pivot-rod, C², is shown in Figs. 8 and 9, said cutter being held at the rearward limit of its movement by a downwardly-projecting spring, C³, attached to the rear surface of the arm and engaged with a stationary bar, C⁶, and adapted to swing downwardly and toward the guide B in a manner generally similar to the cutter above described. In this case the cutter C is without the depending side flanges before described; and in order to prevent the cornstalks from being caught between a side edge of one cutter and the adjacent edge of an adjacent one which is thrust forward in the backward movement of the latter, means are provided as described in the following: The arm C′, as more clearly shown in Fig. 9, is formed of a thin metal plate attached centrally at its upper edge to the cutter. Immediately beneath and in contact with the said cutter, at either side of the plate, are placed two sliding blocks, H H, said blocks being located in guide-slots formed by the lower surface of the cutter and the upper edges of two blocks H′ H′, secured upon the ends of the arm C′ below the cutter. The said blocks H H are pivoted at their rear ends upon a pivot-rod, H², arranged adjacent to and beneath the rear end of the cutter, and their opposite ends are extended to the cutting-edges of the cutters. The pivot-rod H² is so located and the blocks H H are so arranged that when the cutter is at the rearward limit of its movement the surfaces of the blocks will be flush with the cutting-edge of the cutter, the said end surfaces being backwardly and downwardly inclined from the said cutting-edges, so that a V-shaped opening will be formed between the said surface and the edge of an adjacent cutter when the latter is depressed, whereby a cornstalk or other object will be forced out from between the end of the block and the said adjacent cutter as the latter rises, in the same manner as before described in connection with the flanges c′. The ends of the blocks H also serve to prevent contact of the stalks with the cutters, in the same manner as does the guide B⁴, hereinbefore described.

The blocks H′, before mentioned, are, as shown, extended to cover the entire lower part of the arms C′, and operate to keep the lower ends of the latter in position longitudinally upon the pivot-rod.

In Fig. 10 another form of the cutting device is shown, in which sliding blocks H H are employed in the same manner and for the same purpose as the blocks H H before described. In this case the said blocks are pivoted at their rear ends upon a stationary pivot-rod, H², and they are held in contact with the lower surface of the cutter by a pin, h, fixed in the arm C', and engaged at its ends with guide-slots h', formed in said block parallel with the lower surface of the cutter. The spring C³, for holding the cutters away from the guide B', is, as shown in Fig. 10, attached to a fixed support, H, and adapted to press backwardly at its free end upon the front edge of the arm C'.

The forms of the cutting device last described may sometimes be advantageously used; but the form of the cutters in which they are provided with depending flanges is preferred, for the reason that when so constructed said cutters will more surely operate at all times to effectually exclude any object that by its presence between the edges of the cutters may tend to prevent the return of said cutters to their normal position.

In Fig. 11 still another form of the cutter is shown, in which the latter is of curved form longitudinally, and is pivoted to a vertically-movable block, I, supported upon a suitable guide, I', upon the machine-frame, and suspended at the upper limit of its movement by a spiral spring, I². The block I is curved upon its upper surface to fit the concave under surface of the cutter, and the latter is supported upon an arm, I³, pivoted to the block I, near the forward vertical face of the latter, and nearly beneath the cutting-edge of the cutter. The knife is thrown forward in this case by a rotary movement upon its pivot caused by the engagement of an inclined slot, i, in the arm I³ with a stationary rod, i', which passes through a vertical slot, i², in the block I, whereby the latter is permittted to move downwardly, but which is arranged to limit its upward movement. The cutter is operated in this case by the downward pressure of the butt of the ear upon the cutter in the same manner as hereinbefore described.

Instead of actuating the transversely-arranged cutters above described solely by the downward pressure of the ears upon the cutters themselves in the manner above stated, said cutters may be thrown forward against the guide B' to sever the ears by positively-acting devices brought into operative engagement with the cutters by the contact of the ears with the cutter or with a movable part located adjacent to or above the cutter. Devices for this purpose are illustrated in Figs. 12, 13, and 14, in which the cutters are supported in such manner as to permit a free longitudinal movement thereof, and are thrown forward by a revolving shaft, J, provided with projecting wings j, adapted to engage the cutters or a downwardly-projecting part thereon. In Fig. 12 the cutter is sustained upon a spring, K, adapted to permit both a longitudinal and vertical movement therein, and is provided with a depending part or projection, K', which, when the cutter is depressed by the contact of an ear therewith, is thrown downwardly into the path of one of the wings j of the shaft J, whereby the cutter will be thrown forward. In the particular construction shown in Fig. 12 the cutter is supported and held accurately in position with relation to the adjacent cutters by means of a block, L, which is pivotally supported at its rear end by a pivot-rod, L', located at the rear of the cutters, and is adapted to move vertically at its front end. The said block is provided with a longitudinal slot, l, and the cutter is connected with the spring K at its upper end, which is bent forward parallel with the cutter by means of a vertical plate, k, adapted to slide in the slot l, and the projection K' is attached to the lower surface of the forwardly-bent end of the said spring. The forward end of the block L is in this case preferably arranged to come in alignment with the cutting-edge of the cutter when the latter is in its normal position, this construction serving to prevent stalks or other objects from becoming caught between the edge of the cutter and an adjacent cutter which is rising from its depressed position, and also to protect the edges of the cutters in a manner hereinbefore fully set forth.

In Figs. 13 and 14 a device is shown in which the cutter C is held in a stationary guide, and is positively actuated by a revolving drum, J, provided with wings j, as before described, and adapted to engage a movable part attached to the cutter, which is thrown downwardly into the path of the wings by the action of the ear upon a separate movable piece located above the knife. As illustrated in said figures, the several cutters are supported and guided upon a stationary piece, M, arranged parallel with the guide B', the cutters being located upon the upper surface of the piece M, and held so as to slide freely therein by means of a plate, N, placed against the lower surface of the piece M, and connected rigidly with the cutter by means of two parallel plates, n, extending through a slot or aperture, m, in the said piece M. The cutter and the plate N are slotted opposite the space between the plates n, and between said plates is located a swinging dog, O, pivoted at its front end to the said plates, and made of triangular shape, and arranged with one of its sides to the rear, and with its rear corners adjacent to said side extended through the cutter and the plate M. The said dog is held with its upper rear corner above the cutter by a spring, O', and upon the upper surface of the cutter is placed a sliding block, P, held in place therein by a strip or plate, P', extending over said piece M, said block having upon its under surface an inclined face, p, adapted to engage the projecting upper end of the dog O. The block P is extended forward to a point over the cutting-edge of the cutter, and in such position with reference to the guide B' that an ear of corn coming between the end of the block and the guide will thrust the block backwardly, and by the action of the inclined face $p$ upon the dog O thereby depress said dog so as to bring its downwardly-projecting portion into the path of the revolving wings $j$. The cutter is held at the rearward limit of its movement by a spring, $C^3$, arranged to press backwardly upon the plate M, and the block P is similarly held forward by a spring, $p'$, arranged to press upon its rear end, as shown.

I am aware that it has been proposed heretofore to employ as a means of severing the ears from standing cornstalks a double series of opposing knives or cutters, said knives being sharpened at one end and pivoted at their opposite ends upon axes parallel with their cutting-edges, so that the free sharpened edges of the cutters may be swung downwardly and toward each other, pivoted segments or pieces having sliding engagement with the knives and adapted for engagement with the ears being employed to move the cutters, as shown in Letters Patent No. 35,921, granted July 22, 1862, and my invention does not therefore embrace a construction similar to that shown in said patent.

Among the other objections to a device embracing opposing pivoted cutters an obvious one is that if the sharpened edges of the cutter are made to come together, so as to completely sever the ears, said edges will be liable to strike each other, and thereby become dulled, and if not brought sufficiently close to touch each other they will fail to completely sever the ears. An important advantage obtained by the use of the guide B' or a similar part opposed to the cutters is that the cutters may come in contact with the guide, so that the stalks will be completely cut off, notwithstanding slight variations in the lengths of the cutters.

It is to be understood that the appended claims cover the several parts or elements therein set forth when said parts or elements are in form to obtain either, any, or all of the advantages, or to perform either, any, or all of the functions gained by or belonging to them in the particular form thereof herein shown.

I claim as my invention—

1. In a corn-harvester, the combination, with the machine-frame, of a longitudinal guide and a series of transversely-located independently-movable cutters arranged with their cutting-edges parallel with and in opposition to the said guide, substantially as and for the purpose set forth.

2. In a corn-harvester, the combination, with the machine-frame, of a longitudinal guide, a series of transversely-located independently-movable cutters arranged with their cutting-edges parallel with and opposed to the said guide, and a series of springs applied to hold the said cutters at the backward limit of their movement, substantially as and for the purpose set forth.

3. In a corn-harvester, the combination, with the machine-frame and an upwardly and rearwardly inclined guide, of a series of transversely-located and independently-movable cutters arranged parallel with the said guide and adapted to operate in opposition thereto, substantially as and for the purpose set forth.

4. In a corn-harvester, the combination, with the machine-frame and a longitudinal guide thereon, of a series of transversely-located independently-movable cutters arranged with their cutting-edges parallel with the said guide and pivotally supported upon the machine-frame with their axes of oscillation below and at the rear of the said cutting-edges, whereby a downward pressure upon the said cutting-edges will cause a forward movement of the cutters toward the opposing surface of the guide, substantially as and for the purpose set forth.

5. In a corn-harvester, the combination, with the machine-frame and a longitudinal guide thereon, of a series of transversely-located independently-movable cutters arranged with and in opposition to their cutting-edges parallel with the said guide and pivotally supported upon the machine with their axes of oscillation below and at the rear of the said cutting-edges, and a series of springs adapted to retain the cutters normally at the backward limit of their movement, substantially as and for the purpose set forth.

6. In a corn-harvester, the combination, with the machine-frame and a longitudinal guide thereon, of a series of transversely-located independently-movable cutters arranged with their cutting-edges parallel with and in opposition to said guide, a series of supporting-arms, C', attached to and sustaining the cutters, a pivot-rod, $C^2$, affording pivotal bearings for the several arms C', and a series of springs acting separately upon the said arms for holding the cutters at the rearward limit of their movement, substantially as and for the purpose set forth.

7. In a corn-harvester, the combination, with the machine-frame and a longitudinal guide thereon, of a series of transversely-located independently-movable cutters arranged with their cutting-edges parallel with and in opposition to said guide, a series of centrally-apertured supporting-arms, C', attached to and sustaining said cutters, a pivot-rod, $C^2$, affording pivotal bearings for the several arms C', a fixed bar, $C^4$, extending through the apertures of the arms and operating as a stop to limit the rearward and forward movement of the cutters, and a series of springs, $C^3$, attached to said bar and acting at their free ends upon the said arms C' so as to retain the cutters at the rearward limit of their movement, substantially as and for the purpose set forth.

8. In a corn-harvester, the combination, with the machine-frame and a longitudinal guide, B', of a series of transversely-located and independently-movable cutters arranged with their cutting-edges parallel with and in opposition to the said guide, and a second guide, B⁴, arranged parallel with the guide B' and the said cutting-edges, substantially as and for the purpose set forth.

9. In a corn-harvester, the combination, with the machine-frame and a series of transversely-arranged cutters, C, of a guide, B', arranged parallel with the cutting-edges of the cutters and having a vertical bearing-surface opposed to the cutters, substantially as and for the purpose set forth.

10. In a corn-harvester, the combination, with the machine-frame and a longitudinal guide thereon, of a series of transversely-arranged independently-movable cutters, C, provided with depending side flanges, c', downwardly and rearwardly inclined upon their forward ends, substantially as and for the purpose set forth.

11. In a corn-harvester, the combination, with the machine-frame and a longitudinal guide thereon, of a series of transversely-arranged independently-movable cutters, C, provided with depending side flanges, c', having cutting-edges upon their forward ends, substantially as and for the purpose set forth.

12. In a corn-harvester, the combination, with the machine-frame and a guide thereon, of a series of transversely-located independently-movable cutters arranged with their cutting-edges in opposition to the guide, rotatory crank-shafts E' E², rotatably mounted upon said frame, and rakes E, supported upon said crank-shafts, substantially as and for the purpose set forth.

13. In a corn-harvester, the combination, with a series of transversely-arranged cutters, C, supported upon the main part or body A of the machine-frame, and an opposing longitudinal guide, B', arranged at one side of the frame, of metal yokes A' A² for supporting said guide from the said main part of the frame, substantially as and for the purpose set forth.

In testimony that I claim the foregoing as my invention I affix my signature in presence of two witnesses.

CHARLES F. BASSETT.

Witnesses:
   OLIVER E. PAGIN,
   C. CLARENCE POOLE.